Patented Jan. 8, 1952

2,582,160

UNITED STATES PATENT OFFICE 2,582,160

BUTADIENE-ACRYLONITRILE COPOLYMER COMPOSITION CONTAINING A RESIN OCCURING IN UTAH RESIN BEARING COAL

Lino J. Radi, Somerville, N. J., assignor to Interchemical Corporation, New York, N. Y., a corporation of Ohio No Drawing. Application October 20, 1948, Serial No. 55,644

6 Claims. (Cl. 260—27)

This invention relates to the processing of butadiene-acrylonitrile rubbery copolymers and is particularly directed to the improvement of the processing characteristics thereof whereby such copolymers can be more readily handled by the customary rubber-processing equipment. More especially, the invention is concerned with the improvement of the milling properties of butadiene-acrylonitrile copolymers containing from about 5 to 50 per cent acrylonitrile and with improvements in the properties of the milled products obtained.

Although butadiene-acrylonitrile rubbery copolymers such as Buna N, Hycar, Perbunan, Butaprene, Chemigum, and the like have gone into extensive use during the past few years, the processing of this type of synthetic rubber presents many difficulties which render the working thereof prolonged and expensive. Furthermore, the processing of these butadiene-acrylonitrile copolymers in conventional equipment, especially the customary roll mill, frequently results in milled stock lacking in many of the desired properties such as tear resistance, surface hardness, stability on aging, and abrasion resistance.

It is therefore an object of the present invention to provide an improved method of processing butadiene-acrylonitrile. Another object of the invention is to provide processed butadiene-acrylonitrile copolymer products having improved physical and chemical properties. Other objects of the invention will become apparent as the description of the invention proceeds.

It has now been discovered that the processing characteristics of butadiene-acrylonitrile rubbery copolymers can be materially improved by incorporating therewith limited amounts of a Utah-type coal resin. Specifically, the incorporation of from 5% to about 60%, based on copolymer, of the coal resin has been found to reduce the time and cost of milling the rubbery copolymer and compounding it with other ingredients. The milled products have, among other improved properties, reduced cold flow, improved tear resistance, increased surface hardness, increased tack, improved aging properties, and increased abrasion resistance. Such butadiene-acrylonitrile rubbery copolymers containing a Utah-type coal resin can be readily compounded, during the processing thereof, with the necessary amounts of pigment, fillers, and the like, that are customarily added to rubbery materials during the processing thereof. Moreover, the addition of the Utah-type coal resin does not adversely affect the curing of the milled butadiene-acrylonitrile copolymer.

The coal resin which is to be incorporated with the butadiene-acrylonitrile copolymers is obtained from resin-bearing coals such as those found in extensive deposits in Utah. These coals, particularly those obtained from the Utah deposits, contain substantial percentages (up to 5% and more) of such resinous material, which may be separated and recovered therefrom in various manners. In accordance with the present invention, the resin is preferably employed in a coal-free condition. It can advantageously be recovered from the coal by the following two-stage procedure:

The resin is first separated from the bulk of the coal by aqueous flotation as described, for example, in Green U. S. Patent 1,773,997. The resulting resin concentrate, which still contains an appreciable proportion of coal (up to 15 to 20%) admixed therewith, is then dissolved in a solvent composed essentially of saturated hydrocarbons having 6 or less carbon atoms in accordance with the disclosure of the copending Lee application, Serial No. 515,804, filed December 27, 1943, and now abandoned. The insoluble coal is separated from the resulting resin solution by filtration, and the resin itself is then recovered in a substantially coal-free condition by vaporization of the solvent from the solution. If a light-colored resin product is desired, the resin solution may be filtered through a bed of activated clay or the like.

A typical Utah-type coal resin, recovered in this manner, is soluble in ethers, petroleum and coal-tar hydrocarbons, and vegetable oils, partially soluble in esters and ketones, and insoluble in the lower alcohols. The following physical and chemical characteristics are typical of a representative Utah-type coal resin which has been recovered by extraction with hexane:

Specific gravity _____ 1.03–1.06
Softening point (capillary method) _____ 160° C.
Refractive index _____ 1.544
Physical state _____ Brittle solid
Acid value _____ 6–11
Iodine number (Wijs) _____ 140–150
Molecular weight (average) _____ 732
Analysis:
    Carbon _____ 87.04%
    Hydrogen _____ 11.00%
    Nitrogen _____ 0.96%

The coal resin is advantageously compounded with a butadiene-acrylonitrile rubbery copolymer, especially a copolymer containing from about 5% to about 50% acrylonitrile, in an amount ranging from about 5% to 60% by weight, based on rubbery copolymer. Within this range of proportions occurs the most significant increase in processability of the rubbery copolymer with the production of a product having the most desirable characteristics. Less than 5 parts of coal resin may be used, but in such case the increase in processability of the copolymer may not be sufficient to permit the ready incorporation therewith of the desired amounts of pigments and fillers. More than 60 parts of coal to 100 parts of copolymer may also be employed, but in such event the product may be too boardy for certain applications. Sufficient coal resin should, of course, be incorporated with the rubbery copolymer to improve its processing characteristics and to enable it to be broken down on milling to the extent necessary for the desired purpose. The resin may be incorporated with the copolymer either before the copolymer is passed through a roll mill or other rubber handling equipment or during the milling of the copolymer.

As is conventional in the field the rubbery copolymer may be compounded with suitable additives such as anti-oxidants, accelerators, fillers, pigments, and the like. The use of the coal resin additive of the present invention facilitates the incorporation of these conventional additives. Also, as has already been mentioned, the resulting milled or milled and cured product possesses many improved physical properties. Thus, the incorporation of the coal resin tends to reduce cold flow, increase tear resistance, increase surface hardness, increase tack, and increase abrasion resistance in the compounded copolymer. These desirable improvements in the physical properties of the rubbery copolymers are brought about without sacrificing, to any great extent, any of the many desirable properties of these particular copolymers.

The following example illustrates a typical formulation of butadiene-acrylonitrile copolymers compounded with a coal-free Utah-type coal resin:

Example I

| | Parts by weight |
|---|---|
| Butadiene-acrylonitrile rubbery copolymer containing approx. 15% acrylonitrile | 100.0 |
| Utah-type coal resin | 35.0 |
| Anti-oxidant (polymerized trimethyl hydroquinone) | 2.0 |
| Rubber accelerator (benzothiazol disulfide) | 2.0 |
| Carbon black | 50.0 |
| Zinc oxide | 5.0 |
| Magnesium oxide | 5.0 |
| Sulfur | 2.0 |
| Paraffin wax | 0.5 |
| Stearic acid | 1.5 |

The butadiene-acrylonitrile copolymer was first sheeted on a cold mill for five minutes, then the coal resin was slowly added. After the coal resin was well dispersed the other ingredients were added and milling was continued for fifteen minutes. This milled stock was then cured in a laboratory press for thirty minutes at 310° F.

The presence of the coal resin rendered the milling of the butadiene-acrylonitrile and the incorporation of the other conventional ingredients therewith much more easy. The milled product, as compared to a similar product without the coal resin processing additive, possessed improved cold flow, tear resistance, surface hardness, tack, aging properties and abrasion resistance.

Another typical formulation is as follows:

Example II

| | |
|---|---|
| Butadiene-acrylonitrile rubbery copolymer containing approximately 25% acrylonitrile | 100 |
| Utah-type coal resin | 20 |
| Anti-oxidant (e. g. phenyl-$\beta$-naphthylamine) | 2 |
| Rubber accelerator (e. g. benzothiazol disulfide) | 2 |
| Carbon black | 50 |
| Zinc oxide | 5 |
| Magnesium oxide | 5 |
| Sulfur | 2 |
| Paraffin wax | 0.5 |
| Stearic acid | 1.5 |

Similar compositions, containing Utah-type coal resin in varying amounts, were prepared and all of these compositions containing coal resin within the limits of 5 to 60 parts coal resin to 100 parts copolymer possess very noticeable improvements in at least one or more of the above properties. Likewise, several different butadiene-acrylonitrile rubber copolymers, containing varying amounts of acrylonitrile within the limits of 5 to 50% were tested in compositions similar to that of Example I and in every case there were improvements in the processability of the copolymer compositions as well as improvements in the properties of the milled product.

A specific embodiment of the present invention is shown in Example III, which illustrates a typical rubber floor tile made by employing the teachings of the invention.

Example III

| | |
|---|---|
| Butadiene-acrylonitrile rubbery copolymer containing approximately 25% acrylonitrile | 100 |
| Plasticizer | 65 |
| Utah-type coal resin | 40 |
| Clay | 400 |
| Titanium dioxide | 50 |
| Rubber accelerator (e. g. tetramethyl thiuram monosulfide) | 3 |
| Sulfur | 15 |
| Stearic acid | 3 |

The plasticizer in the above formulation can be any of the common types such as copolymers of isobutylene with isoprene, petroleum motor oil (e. g. of low aniline-naphthenic type) or a chemical plasticizer such as dioctyl phthalate, or mixtures of two or more of these plasticizers.

The processing of the stock was carried out on a roll mill in a conventional manner and then sheeted at a thickness of approximately one eighth inch. After curing the sheeted material at 330° F. for 10 minutes it was tested for hardness, chemical resistance, water resistance, oil resistance, abrasion resistance, aging, impact, modulus and flexibility.

The properties of the sheeting made according to Example III as compared to a similar sheeting made using a plasticizing resin of the prior art, e. g. cumarone-indene resin, indicate that the tile made according to Example III is equal or superior to the cumarone-indene plasticized tile in all of the properties tested. For instance, as compared to coumarone-indene plastisized tile, the coal resin plasticized tile had a higher degree of hardness, greater abrasion resistance, better low temperature flexibility, and better aging characteristics.

Having now described my invention and the manner in which it may be practiced, I claim as my invention:

1. In the method of compounding a butadiene-acrylonitrile rubbery copolymer, the steps of incorporating with such a copolymer 5 to 60%, based on the weight of the copolymer, of a resin consisting essentially of carbon and hydrogen, having an average molecular weight on the order of 1000 and a refractive index of 1.544 and occurring in Utah resin-bearing coals, and milling the mixture to obtain a rubber compound.

2. The method of compounding a butadiene-acrylonitrile rubbery copolymer as claimed in claim 1 in which the rubbery copolymer contains from about 5% to about 50% acrylonitrile.

3. The method of compounding a butadiene-acrylonitrile rubbery copolymer as claimed in claim 1 in which the rubbery copolymer contains approximately 75% butadiene and 25% acrylonitrile.

4. A composition comprising a rubbery copolymer of butadiene and acrylonitrile and 5 to 60%, based on the weight of the copolymer, of a resin consisting essentially of carbon and hydrogen, having an average molecular weight on the order of 1000 and a refractive index of 1.544 and occurring in Utah resin-bearing coals.

5. The composition as claimed in claim 4, in which the rubbery copolymer of butadiene and acrylonitrile contains from about 5 to 50% acrylonitrile.

6. The composition as claimed in claim 4, in which the rubbery copolymer of butadiene and acrylonitrile contains approximately 75% butadiene and 25% acrylonitrile.

LINO J. RADI.

REFERENCES CITED

The following references are of record in the file of this patent:

UNITED STATES PATENTS

| Number | Name | Date |
| --- | --- | --- |
| 2,461,551 | Lee et al. | Feb. 15, 1949 |

OTHER REFERENCES

Pages 8, 9, 50, 52, 54, 56 and 58, Paint, Oil and Chemical Review, June 10, 1948.